US010502187B2

(12) United States Patent
Enevoldsen et al.

(10) Patent No.: US 10,502,187 B2
(45) Date of Patent: Dec. 10, 2019

(54) ROTOR BLADE WITH NOISE REDUCTION MEANS

(71) Applicant: Siemens Gamesa Renewable Energy, Brande (DK)

(72) Inventors: Peder Bay Enevoldsen, Vejle (DK); Stefan Oerlemans, Herning (DK); Bodo Richert, Herning (DK); Bo Birkemose, Hørning (DK)

(73) Assignee: SIEMENS GAMESA RENEWABLE ENERGY A/S (DK)

( * ) Notice: Subject to any disclaimer, the term of this patent is extended or adjusted under 35 U.S.C. 154(b) by 271 days.

(21) Appl. No.: 15/587,220

(22) Filed: May 4, 2017

(65) Prior Publication Data
US 2017/0342960 A1 Nov. 30, 2017

(30) Foreign Application Priority Data
May 27, 2016 (EP) .................................. 16171695

(51) Int. Cl.
*F03D 1/06* (2006.01)
*F03D 7/02* (2006.01)
*F03D 17/00* (2016.01)

(52) U.S. Cl.
CPC ......... *F03D 7/0296* (2013.01); *F03D 1/0675* (2013.01); *F03D 17/00* (2016.05);
(Continued)

(58) Field of Classification Search
CPC ...... F03D 1/0675; F03D 7/0296; F03D 17/00; F05B 2260/962; F05B 2270/333; Y02E 10/721; Y02E 10/723
See application file for complete search history.

(56) References Cited

U.S. PATENT DOCUMENTS 5,677,958 A 10/1997 Lehringer
5,995,632 A * 11/1999 Okada .................. F04D 29/663
381/71.3
(Continued)

FOREIGN PATENT DOCUMENTS

CA 2719171 A1 2/2010
CN 1126525 A 7/1996
(Continued)

OTHER PUBLICATIONS

Non-English Chinese Office Action for Application No. 201710385267.0, dated Oct. 24, 2018.
(Continued)

*Primary Examiner* — Igor Kershteyn
(74) *Attorney, Agent, or Firm* — Schmeiser, Olsen & Watts LLP

(57) ABSTRACT

A rotor blade with a leading edge and a trailing edge, wherein the rotor blade is designed and configured for being exposed to a fluid flowing substantially from the leading edge to the trailing edge) of the rotor blade, the rotor blade includes at least one sensor for detecting flow characteristics of the fluid, and the rotor blade further includes at least one actuator for producing an anti-noise signal. The sensor and the actuator are both arranged at the surface of the rotor blade, and the actuator is arranged and prepared such that flow-induced edge noise of the rotor blade, which is generated by the fluid, is at least partly cancelled out by the anti-noise signal. The disclosure furthermore relates to a wind turbine including at least one such rotor blade.

15 Claims, 3 Drawing Sheets

(52) U.S. Cl.
CPC ... *F05B 2260/962* (2013.01); *F05B 2270/333* (2013.01); *Y02E 10/721* (2013.01); *Y02E 10/723* (2013.01)

(56) References Cited

U.S. PATENT DOCUMENTS

| | | | |
|---|---|---|---|
| 8,041,540 B2* | 10/2011 | Kerber | F03D 17/00 340/679 |
| 8,232,663 B2* | 7/2012 | Kinzie | F03D 7/0296 290/44 |
| 8,267,657 B2 | 9/2012 | Huck | |
| 2007/0086598 A1 | 4/2007 | De Callafon | |
| 2009/0097976 A1 | 4/2009 | Driver et al. | |
| 2010/0143117 A1 | 6/2010 | Xiong | |
| 2011/0268558 A1 | 11/2011 | Driver et al. | |
| 2012/0025530 A1 | 2/2012 | Kinzie | |
| 2012/0134837 A1 | 5/2012 | Drobietz | |
| 2014/0142888 A1* | 5/2014 | Duncan | F03D 7/0296 702/150 |
| 2015/0132130 A1* | 5/2015 | Brown | F03D 17/00 416/43 |
| 2015/0240787 A1* | 8/2015 | Byskov | F03D 17/00 416/1 |
| 2015/0354402 A1* | 12/2015 | Ehsani | F03D 17/00 290/44 |
| 2016/0076516 A1* | 3/2016 | Butterworth | F03D 7/022 416/1 |
| 2016/0090968 A1* | 3/2016 | Hansen | H01Q 1/22 416/146 R |

FOREIGN PATENT DOCUMENTS

| | | |
|---|---|---|
| CN | 1886104 A | 12/2006 |
| CN | 101413478 A | 4/2009 |
| CN | 101907062 A | 12/2010 |
| CN | 203163197 U | 8/2013 |
| EP | 0818771 A2 | 1/1998 |
| EP | 1338793 A3 | 9/2010 |
| WO | WO 2008043874 A1 | 4/2008 |

OTHER PUBLICATIONS

National Survey and Design Registered Engineer Environmental Professional Management Committee, China Association of Environmental Protection Industry, "Registered Environmental Engineer Professional Exam Review Materials (Revised version)", vol. II, pp. 490-491, May 31, 2008, China Environmental Science Press, ISBN: 9787511105059; 2008.

Extended European Search Report for Application No. 1617695.6, dated Nov. 9, 2016.

* cited by examiner

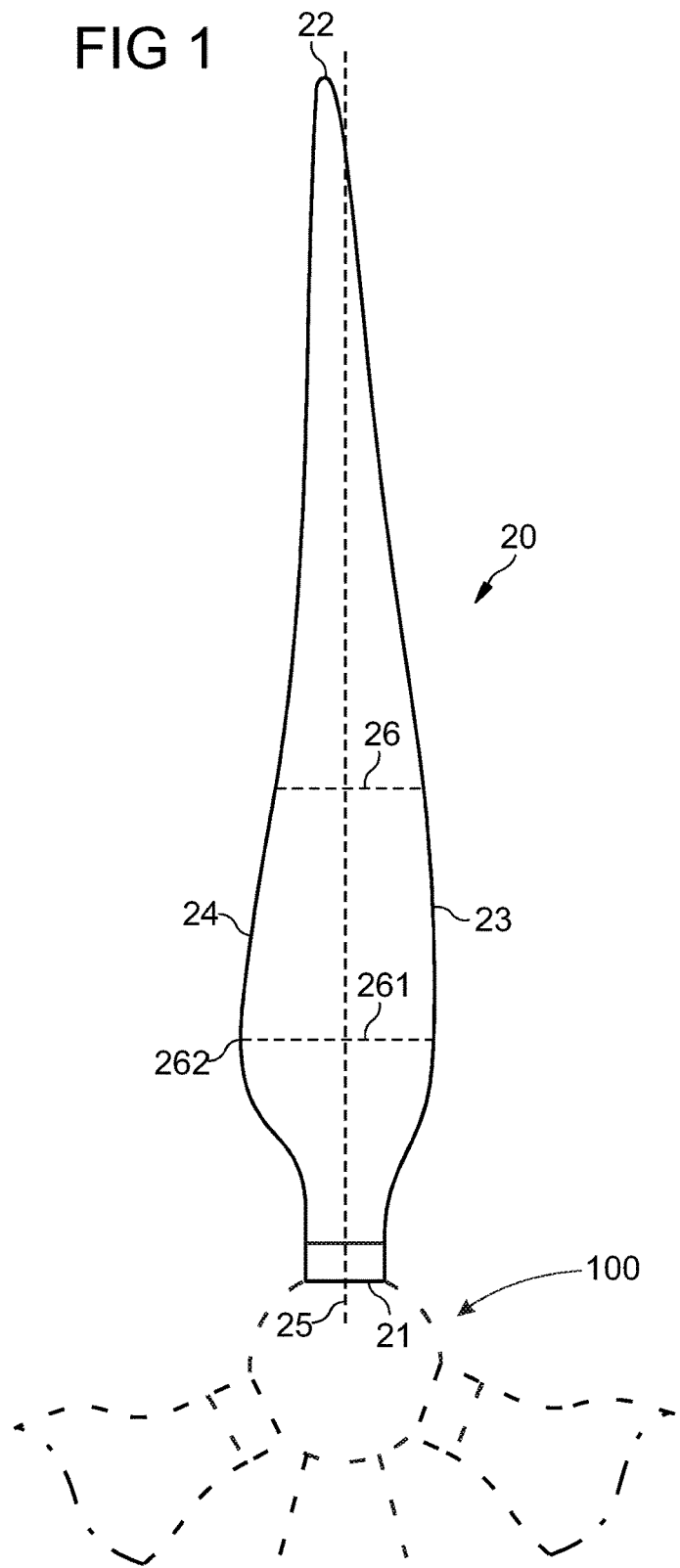

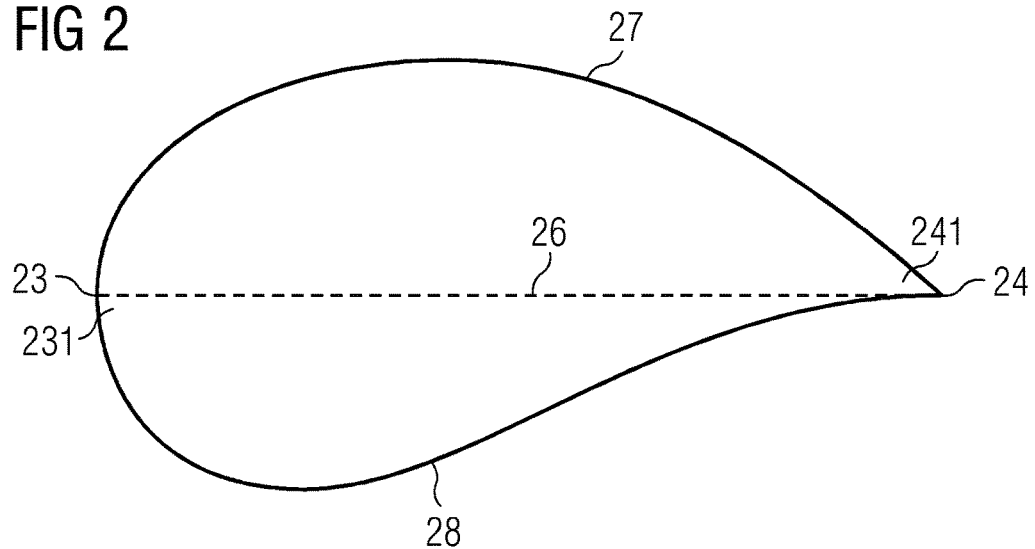
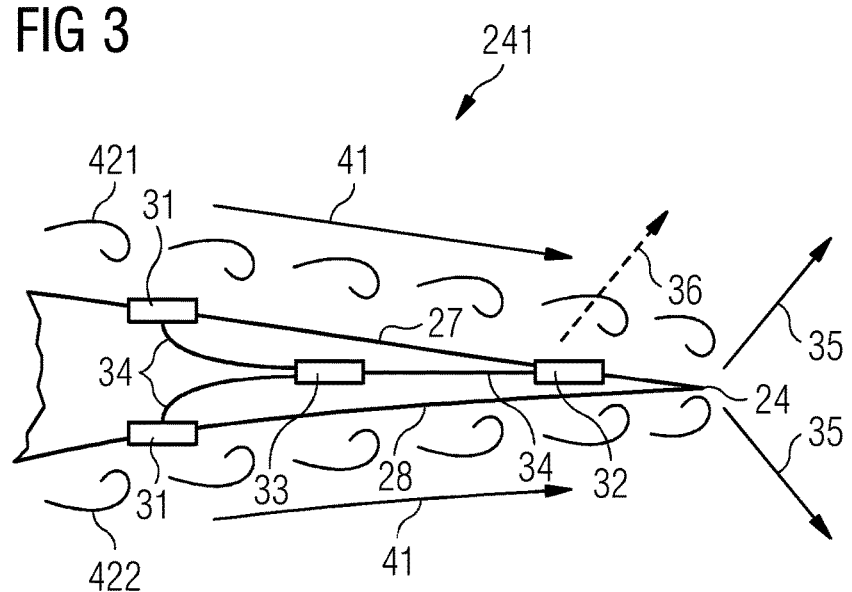

ROTOR BLADE WITH NOISE REDUCTION MEANS

CROSS-REFERENCE TO RELATED APPLICATIONS

This application claims priority to European application No. EP16171695 having a filing date of May 27, 2016, the entire contents of which is hereby incorporated by reference.

FIELD OF TECHNOLOGY

The following relates to a rotor blade which is designed and configured for being exposed to a fluid, wherein flow-induced edge noise of the rotor blade is minimized. Embodiments of the invention are furthermore related to a wind turbine with at least one such rotor blade.

BACKGROUND

When a rotor blade with a leading edge and a trailing edge is exposed to a fluid, such as air, flowing substantially from the leading edge to the trailing edge of the rotor blade, noise is generally generated at the edges of the rotor blade. The intensity of the noise and the frequency of the noise depend on many parameters, such as the properties of the fluid and the properties of the edge, namely the size of the edge and the shape of the edge, e.g. whether it is rounded or sharp.

The noise being generated at the edges is typically undesired. In the example of a wind turbine which is installed onshore, i.e. at the ground, noise which is generated by the rotating rotor blades can be perceived as a nuisance by people in the vicinity of the wind turbine. For this reason, there exist various legal provisions and restrictions regarding the noise level which is allowed to be produced by such a wind turbine at a certain distance from the wind turbine. As a consequence, wind turbines may either need to be placed further away from residential areas or they have to be operated in such a manner that the maximum allowed level of noise is not exceeded. This means that wind turbines may need to be curtailed in certain conditions because of the flow-induced edge noise.

As this issue is known since several years, various approaches for reducing flow-induced edge noise of a rotor blade have been proposed. These approaches include the shape and the design of the airfoil. In this context, particularly the shape and the design of the trailing edge of the rotor blade is of utmost importance. Aerodynamic add-ons may be added to or included in the rotor blade in order to minimize the flow-induced edge noise of the rotor blade. Well-known add-ons for noise reduction are serrations such as a serrated panel which is mounted to the pressure side or suction side of the rotor blade close to the trailing edge. However, the still existing and the still generated flow-induced edge noise could still be considerable.

Thus, there exists the desire to provide a concept how to further reduce flow-induced edge noise of a rotor blade.

SUMMARY

According to embodiments of the invention, there is provided a rotor blade with a leading edge and a trailing edge, wherein the rotor blade is designed and configured for being exposed to a fluid flowing substantially from the leading edge to the trailing edge of the rotor blade. The rotor blade comprises at least one sensor for detecting flow characteristic of the fluid, and at least one actuator for producing an anti-noise signal. The actuator and the sensor are both arranged at the surface of the rotor blade. Furthermore, the actuator is arranged and prepared such that flow-induced edge noise of the rotor blade, which is generated by the fluid, is at least partly cancelled out by the anti-noise signal.

In other words, embodiments of the present invention describe a method how to reduce or even completely eliminate flow-induced edge noise from a rotor blade. This reduction or even elimination of the noise is achieved by the use of anti-noise. Since often times flow-induced edge noise is a broadband noise source, caused by a turbulent flow, the edge noise is random, i.e. stochastic. The acoustic pressure fluctuations are non-deterministic, meaning that they cannot be predicted in a temporal sense on the basis of the current or earlier acoustic signals, even when the statistical properties are known.

However, the unsteady surface pressure pattern, that generates the sound at the edge, can be considered to convect unchanged with the flow along the chord of the rotor blade. Note that in practice this unchanged convection happens until a certain degree. This means that minimum changes of the unsteady surface pressure pattern is possible. This phenomenon is referred to in the literature as the 'frozen turbulence' assumption. In embodiments of the present invention, this fact is used to detect the unsteady surface pressures upstream of the edge so that a noise cancelling anti-noise signal can be constructed and emitted in anti-phase at the moment when the turbulent eddies, which are responsible for the unsteady surface pressure pattern and noise generation, pass the edge.

Therefore, essential components of the inventive arrangement at the rotor blade are at least one sensor for detecting the flow characteristics of the fluid and at least one actuator for producing the anti-noise signal. Both the sensor and the actuator are arranged at the surface of the rotor blade. This means that they are somehow integrated or added to the rotor blade at its surface. In order to prevent disadvantageous aerodynamic effects one option is to submerge and insert the sensor and the actuator into the shell or surface part of the rotor blade such that they are in contact with the surrounding air but they do not stick out and produce additional turbulences on the surface of the rotor blade.

Note that the term 'actuator' has to be understood in a broad sense. It has to be understood as any means which is able to transform electrical signal into a physical, mechanical movement. Examples of such an actuator are a membrane or a loudspeaker or a morphing surface of the rotor blade. In the broader sense the notion 'actuator' includes any means which is suitable and capable for producing the desired anti-noise signal which is subsequently used in order to at least partly cancelling out the flow-induced edge noise.

Likewise, the mentioned 'sensor' also has to be understood in a broad sense as any means which is capable to detect the flow characteristics of the fluid passing by the sensor. The sensor may, for example, also comprise a membrane. It may also comprise some sort of microphone. In the simplest form, the sensor may just be a small opening in the surface which senses the fluctuating surface pressure induced by the fluid which is passing by the opening, such that this pressure then induces and produces the anti-noise signal.

In an embodiment of the invention, the rotor blade comprises a portion which has the shape of an airfoil comprising a pressure side and a suction side, and the pressure side and the suction side are each confined by the trailing edge and the leading edge of the rotor blade.

In other words, in a preferred embodiment of the invention, the rotor blade is a lift producing rotor blade which has at least partly the shape of an airfoil. An airfoil is characterized in that it comprises a pressure side and a suction side and is able to produce lift when it is exposed to a fluid flowing substantially from the leading edge to the trailing edge of the rotor blade. As it is well-known to the person skilled in the art, the outer surface of such an airfoil shaped rotor blade is characterized by one portion which is referred to as the pressure side and which is confined at one side by the trailing edge and on the other side by the leading edge and the remaining part of the surface is typically referred to as the suction side of the rotor blade.

Embodiments of the present invention particularly relate to a rotor blade of a wind turbine. However, the inventive concept is not limited to flow-induced edge noise of rotor blades of a wind turbine. It can also be applied to reduce flow-induced edge noise from, for example, aircraft wings, helicopter blades, fans, etc.

Exemplarily, the actuator comprises a loudspeaker. Such a loudspeaker is a well-known and readily available, inexpensive device which can be integrated or added to a rotor blade at almost any size in a simple and inexpensive manner, without affecting the aerodynamic flow around the blade.

Regarding the sensor, the sensor may exemplarily comprise a surface pressure transducer. Such a pressure transducer is also well-known and well-proven and may also be added or implemented and included to a rotor blade without large expenses or changes to the existing rotor blade.

Note that the flow-induced edge noise, which is at least partly cancelled out by the anti-noise signal being produced by the actuator, preferably relates to trailing edge noise of the rotor blade, i.e. to noise which is flow-induced edge noise and which is generated in the trailing edge of the rotor blade. However, in principle, embodiments of the present invention may be applied to other flow-induced edge noise sources as well, such as, for instance, leading edge in-flow turbulence noise or tip noise of the rotor blade.

In another embodiment of the invention, the sensor is located upstream of the actuator with regard to the flow direction of the fluid.

As it has been described, the rotor blade is designed and configured for being exposed to the fluid flowing substantially from the leading edge to the trailing edge of the rotor blade; therefore a flow direction can be assigned and defined to the exposed and surrounded rotor blade. In order to efficiently monitor and determine the characteristics of the unsteady surface pressure pattern, these are first in a temporal sense detected by the sensor which is located upstream of the actuator and the resulting and produced anti-noise signal can slightly afterwards be emitted or induced by the actuator. In the case of a rotor blade of a wind turbine to which a chord is assigned, this preferred embodiment may also be described that the actuator is closer to the trailing edge regarding a chordwise distance than the sensor.

In an embodiment of the invention, the sensor and the actuator are both located either on the pressure side or on the suction side of the rotor blade.

This includes the possibility that there are arranged two sensors, one on the pressure side and one on the suction side and there are arranged one or two actuators, one on the pressure side and one on the suction side.

In another embodiment of the invention, the sensor is located at the suction side and the actuator is located at the pressure side, or the sensor is located at the pressure side and the actuator is located at the section side.

Note that the sensor and the actuator may be directly connected with each other via connections means or a connection device, such as a tube or a channel.

This has the advantage of a very simple and robust arrangement. In this case, the distance, in particular the chord wise distance between the actuator and the sensor has to be carefully chosen based on expected unsteady surface pressure pattern and the velocity at which these surface pressure pattern travels towards the edge where the flow-induced edge noise is generated. If this is known or can be foreseen reasonably precisely, then this embodiment is a promising and advantageous way of implementing the inventive concept in a rotor blade.

Alternatively, the rotor blade may further comprise a control unit for constructing the anti-noise signal and the actuator is connected with the sensor via connection means and the control unit.

This has the advantage that a more optimized and tailored anti-noise signal may be produced and that the elimination of the flow induced noise may possibly be achieved in a larger extent. Such a control unit is advantageously located inside the rotor blade, which has the advantage that it does not disturb the air flow which is flowing across the rotor blade and that it is protected from the ambient and the influences of the ambient. Note that the actuator may be arranged and prepared to either induce surface pressure cancellation or to emit a sound signal.

It is also conceivable that the air flow is somehow manipulated, for example by passive or active aerodynamic devices, in order to obtain a certain (fixed) thickness of the trailing edge boundary layer, so that a tuned (passive or active) anti-noise system can be applied. Having a fixed boundary layer thickness makes it easier to design an effective, tuned anti-noise system. Likewise, it is also conceivable that the air flow is somehow manipulated such that a particular (fixed) frequency content of the pressure fluctuations is obtained, so that a tuned (passive or active) anti-noise system can be applied. In other words, the thickness of the boundary layer and/or the frequency of the surface pressure fluctuations could be tuned in order to match a given anti-noise concept. This general principle, of manipulating the air flow to obtain a certain thickness of the boundary layer or a specific frequency content of the pressure fluctuations, can also be applied to other noise reduction concept, such as e.g. trailing edge serrations.

Embodiments of the invention are also related to a wind turbine with at least one rotor blade as described in various embodiments above.

BRIEF DESCRIPTION

Some of the embodiments will be described in detail, with reference to the following figures, wherein like designations denote like members, wherein:

FIG. 1 shows a rotor blade and a wind turbine;

FIG. 2 shows a profile of the rotor blade at a certain spanwise position;

FIG. 3 shows an embodiment of the invention comprising two sensors, a control unit and one actuator;

The illustration and the drawings is in schematic form. It is noted that in different figures, similar or identical elements may be provided with the same reference sign.

DETAILED DESCRIPTION

Figure 4:
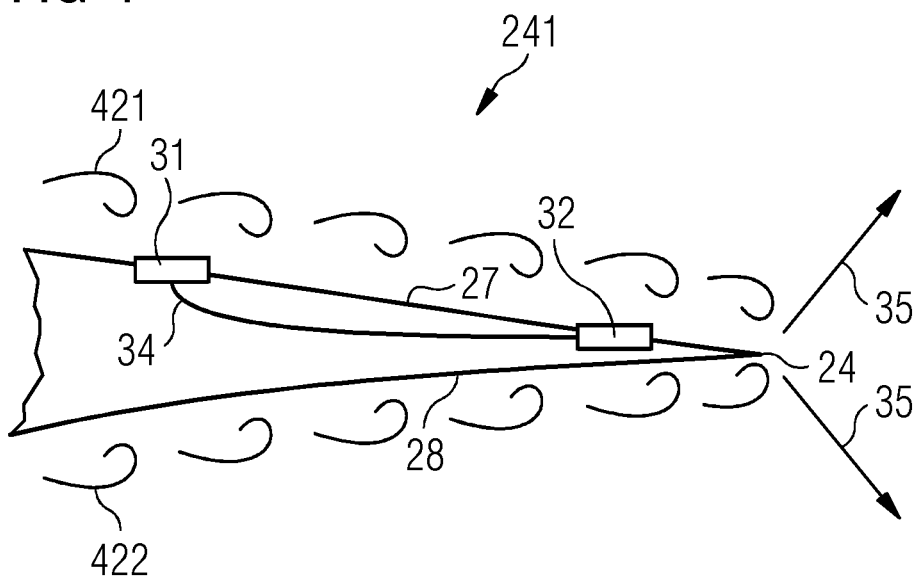
FIG. 4 shows another embodiment of the invention comprising a sensor and an actuator, which are directly connected via connection means.

FIG. 1 shows a rotor blade 20 and a wind turbine 100. The rotor blade 20 comprises a root 21 and a tip 22. The rotor blade 20 furthermore comprises a leading edge 23 and a trailing edge 24. FIG. 1 illustrates a top view or planar view onto the rotor blade 20, namely onto the pressure side of the rotor blade. The rotor blade 20 is characterized by a span 25, which is a straight line projecting away from the root 21. In the case of a rotor blade of a wind turbine, wherein the rotor blade is pitchable about a pitch axis, the pitch axis coincides with the span 25 as defined in the context of this patent application.

Furthermore, a plurality of chords 26 may be assigned to the rotor blade 20. Each chord 26 is oriented perpendicular to the span 25. Therefore, for each spanwise position starting at the root 21 and reaching to the tip 22, a chord 26 may be defined. The chord 26 which is maximum, in other words which has a maximum length or extension, is referred to as the maximum chord 261. The area where the maximum chord 261 is located is referred to as the shoulder 262 of the rotor blade 20.

FIG. 2 shows a schematic view of an airfoil of the rotor blade 20. This airfoil or profile is taken perpendicular to the span 25 of the rotor blade 20. In other words this profile is a cross-sectional view at a specific radial position or spanwise position of the rotor blade. The leading edge 23 can be seen and described as a relatively round edge, whereby the trailing edge 24 is relatively sharply designed. The straight line connecting the leading edge 23 with the trailing edge 24 is referred to as the chord 26.

Note that the whole area from the leading edge 23 up to ten percent of the chord length of the chord 26 as measured from the leading edge 23 is referred to as the leading edge section 231. Likewise, the area which is within ten percent chord wise length away from the trailing edge 24 is referred to as the trailing edge section 241.

Note that in this schematic view the maximum thickness of the airfoil which is defined as the distance between the pressure side 28 of the suction side 27 is relatively large. This thickness often times considerably decreases towards the tip 22 of the rotor blade, at least in modern rotor blades of wind turbines.

Figure 5:
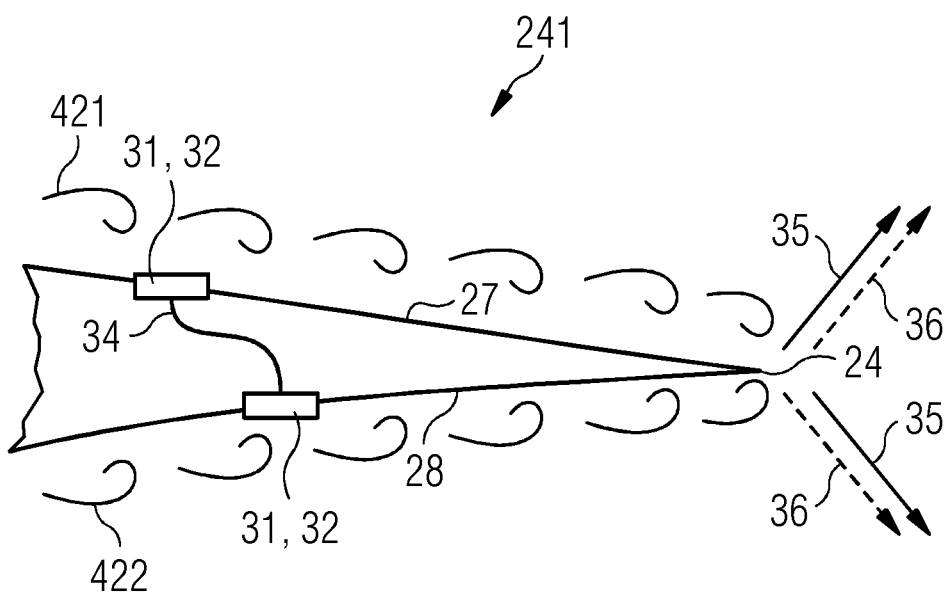
FIG. 5 shows a sensor which is mounted at the suction side and which is directly connected to an actuator which is mounted at the pressure side at the rotor blade.

FIGS. 3 to 5 show three exemplary embodiments of the invention.

FIG. 3 shows a trailing edge section 241 comprising two sensors 31, one sensor 31 being positioned at the suction side 27 of the rotor blade, and one sensor 31 being positioned at the pressure side 28 of the rotor blade. These sensors 31 are located upstream with regard to the actuator 32 which is arranged and positioned at the suction side 27 of the rotor blade 20.

Note that embodiments of the invention is not limited to the case that the sensors are arranged in the trailing edge section of the rotor blade, i.e. in the area which is within ten percent chord wise length away from the trailing edge of the rotor blade towards the leading edge of the rotor blade. Moreover, in an alternative embodiment of the invention, the sensor may also be located further upstream, e.g. twenty percent, or thirty percent, or even forty percent chord wise length away from the trailing edge of the rotor blade towards the leading edge.

Both sensors 31 are connected with the actuator 32 by means of connection means 34. Between the two sensors 31 and the actuator 32 is arranged and located a control unit 33. The control unit is configured to produce the anti-noise signal based on the input which is received by the sensors 31. The anti-noise signal which is emitted by the actuator 32 is symbolized by the arrows 36.

The anti-noise 36 is deliberately chosen such that it destructively interferes with the noise 35 which is generated and emitted at the trailing edge 24 of the rotor blade 20. Note that in the illustration of FIG. 3, two main directions of the noise are visualized by the two arrows 35, one projecting away from the trailing edge 24 into the direction of the suction side, and one projecting away from the trailing edge 24 into the direction of the pressure side. In the exemplary embodiment of FIG. 3, the anti-noise 36 mainly cancels out or minimizes the noise 35 which is emitted and generated at the trailing edge 24 into the direction of the suction side 27. If desired a pressure-side actuator could be added to also eliminate the noise emitted to the pressure side. Also note the turbulent boundary layer which is symbolized by suction side eddies 421 and pressure side eddies 422. The overall flow direction of the fluid is symbolized by reference sign 41.

It should be noted that, instead of anti-noise, the actuator (for example a membrane) may also produce anti-pressure, thus canceling the fluctuating surface pressures which are the source of the trailing edge noise. By (partly) eliminating the fluctuating surface pressures, noise radiation at the trailing edge is suppressed or completely prevented.

In comparison with the embodiment as illustrated in FIG. 3, FIG. 4 shows another embodiment of the invention wherein the control unit 33 is omitted. In contrast, the sensor 31 which is arranged at the suction side 27 is directly connected via connection means 34 with the actuator 32. These connection means may be designed as flexible tubes or channels. The effect, namely the generated anti-pressure which is arranged and prepared to at least partly cancelling out the fluctuating surface pressures on the airfoil surface 27 is in principle comparable to the embodiment as illustrated in FIG. 3. However, the input for the actuator 32 only comes from one sensor at the suction side in the embodiment of FIG. 4 compared to the embodiment of FIG. 3 which implies that the arrangement is more simple, i.e. more robust and more inexpensive, but that it may eliminate slightly less of the noise 35 being generated at the trailing edge 24.

Finally, FIG. 5 illustrates an embodiment of the invention where two membranes, both acting as sensor 31 and actuator 32, are provided. Since trailing edge noise typically radiates to the suction side 27 and the pressure side 28 in anti-phase, such an alternative passive noise cancellation technique may be advantageous. By connecting the suction side 27 of the airfoil and the pressure side 28 of the airfoil, the unsteady surface pressures on the suction side 27 and the pressure side 28 are equalized, however not necessarily to zero. When the equalized pressure side and suction side fluctuating surface pressures arrive at the trailing edge 24, they both radiate the same sound signal to the pressure side and the suction side, respectively. However, these sound signals are radiated in anti-phase, so that the noise is at least partly cancelled out. In order to ensure that the equalized unsteady surface pressures reach the trailing edge at the same time, the membrane position needs to account for the difference and convection speed, on the two sides, the suction side 27 and the pressure side 28 of the airfoil.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A rotor blade with a leading edge and a trailing edge, wherein
   the rotor blade is designed and configured for being exposed to a fluid flowing substantially from the leading edge to the trailing edge of the rotor blade,
   the rotor blade comprises at least one sensor for detecting flow characteristics of the fluid, and
   the rotor blade further comprises at least one actuator for producing an anti-noise signal,
   the sensor and the actuator are both arranged at the surface of the rotor blade,
   the actuator is arranged and prepared such that flow-induced edge noise of the rotor blade, which is generated by the fluid, is at least partly cancelled out by the anti-noise signal, and
   a control unit, located inside the rotor blade, for constructing the anti-noise signal.

2. The rotor blade according to claim 1, wherein the rotor blade comprises a portion which has the shape of an airfoil comprising a pressure side and a suction side, and the pressure side and the suction side are each confined by the trailing edge and the leading edge.

3. The rotor blade according to claim 1, wherein the actuator comprises a loudspeaker.

4. The rotor blade according to claim 1, wherein the sensor comprises a surface pressure transducer.

5. The rotor blade according to claim 1, wherein the flow-induced edge noise, which is at least partly cancelled out by the anti-noise signal being produced by the actuator, is generated at the trailing edge of the rotor blade.

6. The rotor blade according to claim 1, wherein the sensor is located upstream of the actuator with regard to the flow direction of the fluid.

7. The rotor blade according to claim 1, wherein the sensor and the actuator are both located either on the pressure side or on the suction side of the rotor blade.

8. The rotor blade according to claim 1, wherein the sensor is located at the suction side and the actuator is located at the pressure side or vice versa.

9. The rotor blade according to claim 1, wherein the actuator is connected with the sensor via a connection device and the control unit.

10. The rotor blade according to claim 1 wherein the sensor is arranged and prepared to sense surface pressure fluctuations induced by the fluid which is passing by the sensor.

11. The rotor blade according to claim 1, wherein the surface pressure fluctuations produced by the actuator are based on the surface pressure fluctuations sensed by the sensor.

12. The rotor blade according to claim 1, wherein the actuator is arranged and prepared to induce at least partial cancellation of unsteady surface pressures.

13. The rotor blade according to claim 9, wherein the actuator is arranged and prepared to emit a sound signal.

14. A wind turbine with at least one rotor blade according to claim 1.

15. A rotor blade with a leading edge and a trailing edge, wherein
   the rotor blade is designed and configured for being exposed to a fluid flowing substantially from the leading edge to the trailing edge of the rotor blade,
   the rotor blade comprises at least one sensor for detecting flow characteristics of the fluid, and
   the rotor blade further comprises at least one actuator for producing an anti-noise signal,
   the sensor and the actuator are both arranged at the surface of the rotor blade, and
   the actuator is arranged and prepared such that flow-induced edge noise of the rotor blade, which is generated by the fluid, is at least partly cancelled out by the anti-noise signal, wherein the actuator is directly connected with the sensor via connection device, wherein the connection device is a tube or a channel.

* * * * *